United States Patent
Gindelberger

(10) Patent No.: US 6,541,412 B1
(45) Date of Patent: Apr. 1, 2003

(54) CATALYST SYSTEM METHOD FOR PREPARING AND USING SAME IN A POLYMERIZATION PROCESS

(75) Inventor: David E. Gindelberger, Houston, TX (US)

(73) Assignee: Univation Technologies, LLC, Houston, TX (US)

(*) Notice: Subject to any disclaimer, the term of this patent is extended or adjusted under 35 U.S.C. 154(b) by 0 days.

(21) Appl. No.: 09/458,399

(22) Filed: Dec. 10, 1999

(51) Int. Cl.[7] .................. B01J 31/00; B01J 37/00; C08F 4/02; C08F 4/60
(52) U.S. Cl. .................. 502/125; 502/104; 502/158; 502/103; 502/117; 502/167
(58) Field of Search ................. 502/125, 158, 502/103, 117, 104, 167

(56) References Cited

U.S. PATENT DOCUMENTS

| | | | | |
|---|---|---|---|---|
| 2,441,214 A | * | 5/1948 | Thomas et al. | 502/158 |
| 2,623,078 A | * | 12/1952 | Bewley et al. | 502/158 |
| 2,974,133 A | * | 3/1961 | Wiberg et al. | 502/158 |
| 3,058,972 A | * | 10/1962 | Fourcade et al. | 502/125 |
| 3,367,923 A | * | 2/1968 | Tanaka et al. | 502/125 |
| 4,105,847 A | * | 8/1978 | Ito et al. | 502/125 |
| 4,237,254 A | * | 12/1980 | Kitagawa et al. | 502/125 |
| 4,477,587 A | * | 10/1984 | Band | 502/125 |
| 4,742,132 A | * | 5/1988 | Morinaga et al. | 502/125 |
| 4,945,076 A | * | 7/1990 | Piotrowski et al. | 502/125 |
| 5,034,366 A | * | 7/1991 | Karol et al. | 502/125 |
| 5,744,417 A | | 4/1998 | Nagy et al. | 502/155 |
| 5,747,404 A | | 5/1998 | Nagy et al. | 502/104 |
| 5,902,854 A | | 5/1999 | Kelley et al. | 525/101 |
| 6,121,183 A | * | 9/2000 | Cribbs et al. | 502/158 |

FOREIGN PATENT DOCUMENTS

| | | | |
|---|---|---|---|
| EP | 0744432 B1 | 1/1999 | |
| EP | 0909778 A1 | 4/1999 | |
| GB | 906425 | * 9/1962 | 502/158 |
| GB | 2 028 850 | * 3/1980 | 502/158 |
| JP | 64-11107 | * 1/1989 | 502/158 |
| WO | WO 97/45459 | 12/1997 | |
| WO | WO 99/14269 | 3/1999 | |

OTHER PUBLICATIONS

US 2002/0095014 A1, U.S. Pre–Grant publication to Fottinger et al., published Jul. 2002, class 526/129.*
*A New Concept of Supported Metallocene Catalyst: In–situ Supported Metallocene Catalyst*, Chu et al., Institute for Polymer Research, Dept. of Chem. Eng., University of Waterloo, Waterloo, Ontario N2L 3G1, Canada, Date not available.

* cited by examiner

Primary Examiner—Mark L. Bell
Assistant Examiner—J. Pasterczyk
(74) Attorney, Agent, or Firm—Lisa Kimes Jones; Kevin Faulkner

(57) ABSTRACT

A polymerization catalyst system and process, which utilizes a Group 14 and Group 16 containing oil or amorphous solid to solubilize polymerization catalyst components including metallocenes and Group 15 containing polymerization catalysts, is disclosed.

21 Claims, No Drawings

US 6,541,412 B1

CATALYST SYSTEM METHOD FOR PREPARING AND USING SAME IN A POLYMERIZATION PROCESS

FIELD OF THE INVENTION

The present invention relates to catalyst systems and to catalyst system components solubilized or emulsified in a Group 14 and Group 16 containing oil or amorphous solid, and to their use in polymerization processes. In a particular, preferred embodiment, the invention is directed to catalyst systems and components solubilized or emulsified with one or more siloxanes and to methods for preparing and using the same.

BACKGROUND OF THE INVENTION

Developments in polymerization technology have provided more efficient, highly productive and economically enhanced catalyst systems and processes. Especially illustrative of these advances is the development of bulky ligand metallocene-type catalysts and of Group 15 metal containing catalysts. To utilize these systems in industrial slurry or gas phases processes, it is useful that they be immobilized on a carrier or support such as, for example silica or alumina. Bulky ligand metallocene-type catalysts, however, typically exhibit lower activity when supported than in the corresponding homogeneous or non-supported catalyst systems. This "support effect" is especially dramatic when the catalyst system utilizes a stoichiometric activator, for example a bulky ligand metallocene-type/non-coordinating anion catalyst system.

In a typical method to prepare a supported catalyst system, the catalyst and activator are combined in a suitable solvent then added to the support or carrier material. However, systems utilizing stoichiometric activators are often difficult to dissolve in hydrocarbon solvents and as a result are difficult to combine with a support material. Thus, there is a need to improve the solubility of catalyst compounds, especially those utilizing stoichiometric activators, to facilitate the preparation of supported catalysts, and also to reduce the "support effect" when using such catalyst systems.

U.S. Pat. No. 5,747,404 discloses a polysiloxane supported metallocene catalyst where the metallocene-type organometallic catalyst is directly bonded to a silicon atom in a siloxane polymeric oil.

PCT WO 99/14269 discloses organopolysiloxane microgel particles, having a diameter of 5 to 200 nm, with organo-aluminum compounds immobilized thereon, which may be used as cocatalyst with metal compounds of the IV, V, VI and VIII sub-groups of the periodic table, for oligomerization cyclization or polymerization of olefins.

While these catalyst systems and methods have been described in the art, a need exists for an improved catalyst system and method for preparing it.

SUMMARY OF THE INVENTION

This invention provides a new and improved catalyst system, which include a polymerization catalyst combined with a Group 14 and Group 16 atom containing oil or amorphous solid. Preferably, the oil or amorphous solid contains alternating atoms of silicon or germanium and oxygen and most preferably, the oil or amorphous solid is a siloxane.

In another embodiment, the invention is directed to a catalyst system including a polymerization catalyst and an activator, or an activated polymerization catalyst, combined with a Group 14 and Group 16 atom containing oil or amorphous solid.

In another embodiment the invention relates to a catalyst system including a polymerization catalysts and a stoichiometric activator combined with a Group 14 and Group 16 atom containing oil or amorphous solid, where preferably, the oil or amorphous solid contains alternating atoms of silicon or germanium and oxygen.

In another aspect, the invention is directed to a catalyst system which includes a polymerization catalyst and activator combined with a polysiloxane microgel.

In another aspect the invention relates to a method for making a catalyst system which includes solubilizing or emulsifying a polymerization catalyst and/or an activator in one or more Group 14 and Group 16 atom containing oil(s) or amorphous solid(s). Optionally, the method includes further solubilizing the solution or emulsion in a hydrocarbon solvent then combining the resulting solution with a support or carrier.

In another aspect, the invention is directed to a polymerization process utilizing a catalyst system of the invention.

In another aspect, the invention is directed to pre-polymerization process utilizing a catalyst system of the invention.

DETAILED DESCRIPTION OF THE INVENTION

Introduction

The invention is directed toward a polymerization catalyst system, which includes a polymerization catalyst combined with a Group 14 and Group 16 atom containing oil or amorphous solid. Preferably, the oil or amorphous solid includes alternating atoms of silicon or germanium, and oxygen. Most preferably, the oil or amorphous solid is a siloxane or a polysiloxane, including microgels. The Group 14 and Group 16 atom containing oil or amorphous solid is used to solublize or emulsify the polymerization catalyst and/or the catalyst activator, it has been surprisingly discovered that these catalyst solutions or emulsions are highly active especially when a stoichiometric activator is utilized. The polymerization catalyst systems of the invention may be used in solution, slurry, high pressure or gas phase polymerization processes.

Polymerization Catalyst
Bulky Ligand Metallocene-Type Catalyst Compounds

The Group 14 and Group 16 atom containing oil or amorphous solid may be used to create solutions or emulsions of the bulky ligand metallocene-type polymerization catalysts described below. Generally, these catalyst compounds include half and full sandwich compounds having one or more bulky ligands bonded to at least one metal atom. Typical bulky ligand metallocene-type compounds are described as containing one or more bulky ligand(s) and one or more leaving group(s) bonded to at least one metal atom. In one preferred embodiment, at least one bulky ligands is η-bonded to the metal atom, most preferably $\eta^5$-bonded to a transition metal atom.

The bulky ligands are generally represented by one or more open, acyclic, or fused ring(s) or ring system(s) or a combination thereof. The ring(s) or ring system(s) of these bulky ligands are typically composed of atoms selected from Groups 13 to 16 atoms of the Periodic Table of Elements. Preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the Group 14 and Group 16 atom containing non-crystalline compound may be used to create solutions or emulsions of the bulky ligand metallocene-type catalyst compounds represented by the formula:

$$L^A L^B MQ_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably η$^3$-bonding to M and most preferably η$^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligarid. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene-type catalyst compound to form a bulky ligand metallocene-type catalyst cation capable of polymerizing one or more olefin(s). In one embodiment, Q is a monoanionic labile ligarid having a sigma-bond to M. Depending on the oxidation state of the metal, the value for n is 0, 1 or 2 such that formula (I) above represents a neutral bulky ligand metallocene-type catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the Group 14 and Group 16 atom containing non-crystalline compound may be used to create solutions or emulsions of the bulky ligand metallocene-type catalyst compounds of formula (I) where $L^A$ and $L^B$ are bridged to each other by at least one bridging group, A, as represented in the following formula:

$$L^A A L^B MQ_n \qquad (II)$$

These bridged compounds represented by formula (II) are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens, and iron. Non-limiting examples of bridging group A may be represented by R'$_2$C, R'$_2$Si, R'$_2$Si R'$_2$Si, R'$_2$Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R'may be joined to form a ring or ring system. In one embodiment, the bridged, bulky ligand metallocene-type catalyst compounds of formula (II) have two or more bridging groups A (EP 664 301 B1).

In one embodiment, the bulky ligand metallocene-type catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ Of formulas (I) and (II) are different from each other.

Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In one embodiment, bulky ligand metallocene-type catalysts compounds useful in the invention include bridged heteroatom, mono-bulky ligand metallocene-type compounds. These types of catalysts and catalyst systems are described in, for example, PCT publication WO 92/00333, WO 94/07928, WO 91/ 04257, WO 94/03506, W096/00244, WO 97/15602 and WO 99/20637 and U.S. Pat. Nos. 5,057, 475, 5,096,867, 5,055,438, 5,198,401, 5,227,440 and 5,264, 405 and European publication EP-A-0 420 436, all of which are herein fully incorporated by reference.

In this embodiment, the bulky ligand metallocene-type catalyst compound is represented by the formula:

  (III)

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0,1 or 2. In formula (III) above, $L^C$, A and J form a fused ring system. In an embodiment, $L^C$ of formula (III) is as defined above for $L^A$, A, M and Q of formula (III) are as defined above in formula (I).

In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the Group 14 and Group 16 atom containing non-crystalline compound may be used to create solutions or emulsions of the bulky ligand metallocene-type catalyst compounds represented by the formula:

  (IV)

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$(YZ) forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379 and WO 98/22486 and EP-A1-0 874 005 and U.S. Pat. No. 5,637,660, 5,539,124, 5,554,775, 5,756,611, 5,233, 049, 5,744,417, and 5,856,258 all of which are herein incorporated by reference.

In another embodiment, the bulky ligand metallocene-type catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene-type catalyst compounds are those described in PCT publications WO 99/01481 and WO 98/42664, which are fully incorporated herein by reference.

In one embodiment, the Group 14 and Group 16 atom containing non-crystalline compound may be used to create solutions or emulsions of the bulky ligand metallocene-type catalyst compounds represented by the formula:

$$((Z)XA^t(YJ))_qMQ_n \qquad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is also within the scope of this invention, in one embodiment, that the bulky ligand metallocene-type catalyst compounds include complexes of $Ni^{2+}$ and $Pd^{2-}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene-type catalyst are those diimine based ligands of Group 8 to 10 metal compounds disclosed in PCT publications WO 96/23010 and WO 97/48735 and Gibson, et. al., Chem. Comm., pp. 849–850 (1998), all of which are herein incorporated by reference.

Other bulky ligand metallocene-type catalysts are those Group 5 and 6 metal imido complexes described in EP-A2-0 816 384 and U.S. Pat. No. 5,851,945, which is incorporated herein by reference. In addition, bulky ligand metallocene-type catalysts include bridged bis(arylamido) Group 4 compounds described by D. H. McConville, et al., in Organometallics 1195, 14, 5478–5480, which is herein incorporated by reference. In addition, bridged bis(amido) catalyst compounds are described in WO 96/27439, which is herein incorporated by reference. Other bulky ligand metallocene-type catalysts are described as bis(hydroxy aromatic nitrogen ligands) in U.S. Pat. No. 5,852,146, which is incorporated herein by reference. Other metallocene-type catalysts containing one or more Group 15 atoms include those described in WO 98/46651, which is herein incorporated herein by reference. Still another metallocene-type bulky ligand metallocene-type catalysts include those multinuclear bulky ligand metallocene-type catalysts as described in WO 99/20665, which is incorporated herein by reference.

It is also contemplated that in one embodiment, the bulky ligand metallocene-type catalysts of the invention described above include their structural or optical or enantiomeric isomers (meso and racemic isomers, for example see U.S. Pat. No. 5,852,143, incorporated herein by reference) and mixtures thereof.

Group 15 Containing Polymerization Catalyst

The Group 14 and Group 16 atom containing oil or amorphous solid may also be used to create solutions or emulsions of Group 15 metal containing polymerization catalyst. Generally, these catalysts includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

Preferably, at least one of the Group 15 atoms is also bound to a Group 15 or 16 atom through another group which may be a $C_1$ to $C_{20}$ hydrocarbon group, a heteroatom containing group, silicon, gerrnanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a.cyclic group and may optionally be bound to hydrogen,, a halogen, a heterbatom or a hydrocarbyl group, or a heteroatom containing group.

It is also contemplated that any one of the catalyst compounds described above may have at least one fluoride or fluorine containing leaving group as described in U.S. application Ser. No. 09/191,916 filed Nov. 13, 1998.

In another embodiment of the invention the composition containing alternating atoms of Group 14 and Group 16 may be used to create solutions or emulsions including one or more bulky ligand metallocene-type catalyst compounds, and one or more conventional-type catalyst compounds or catalyst systems. Non-limiting examples of mixed catalysts and catalyst systems are described in U.S. Pat. Nos. 4,159, 965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Activator Compositions

The above described polymerization catalyst compounds are typically activated in various ways to yield compounds having a vacant coordination site that will coordinate, insert, and polymerize olefin(s). The catalyst system of the invention may include an activator or activators combined with the composition containing alternating atoms of Group 14 and Group 16.

For the purposes of this patent specification and appended claims, the term "activator" is defined to be any compound or component or method which can activate any of the bulky ligand metallocene-type catalyst compounds and/or the Group 15 metal containing catalysts described above. Non-limiting activators, for example, may include a Lewis acid or a non-coordinating ionic activator or ionizing activator or any other compound including Lewis bases, aluminum alkyls, conventional-type cocatalysts and combinations thereof that can convert a neutral bulky ligand metallocene-type catalyst compound or Group 15 containing metal compound to a catalytically active bulky ligand metallocene-type or Group 15 containing metal compound catalyst cation.

It is within the scope of this invention to use as alumoxane or modified alumoxanes as an activator. There are a variety of methods for preparing alumoxane and modified alumoxanes, non-limiting examples of which are described in U.S. Pat. Nos. 4,665,208, 4,952,540, 5,091,352, 5,206, 199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publication WO 94/10180, all of which are herein fully incorporated by reference.

In one embodiment aluminoxanes or modified alumoxanes are combined with catalyst compound(s) solubilized or emulsified in the composition containing alternating atoms of Group 14 and Group 16 of the invention. In another embodiment MMAO3A (modified methyl alumoxane in heptane, commercially available from Akzo Chemicals, Inc., Holland, under the trade name Modified Methylalumoxane type 3A, see for example those aluminoxanes disclosed in U.S. Pat. No. 5,041,584, which is herein incorporated by reference) is combined with the catalyst compound(s) and the composition containing alternating atoms of Group 14 and Group 16, to form a catalyst system of the invention.

Organoaluminum compounds useful as activators include trimethylaluminum, triethylaluminum, triisobutylaluminum, tri-n-hexylaluminum, tri-n-octylaluminum and the like.

It is within the scope of this invention to use an ionizing or stoichiometric activator, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983) or combination thereof, that would ionize the neutral bulky ligand metallocene-type catalyst and/or the Group 15 containing metal compound. It is also within the scope of this invention to use neutral or ionic activators alone or in combination with alumoxane or modified alumoxane activators.

An example of a neutral stoichiometric activator, which may be solubilized or emulsified by the composition containing alternating atoms of Group 14 and Group 16, include tri-substituted boron, tellurium, aluminum, gallium and indium or mixtures thereof. The three substituent groups are each independently selected from alkyls, alkenyls, halogen, substituted alkyls, aryls arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Most preferably, the neutral stoichiometric activator is trisperfluorophenyl boron or trisperfluoronapthyl boron.

In a preferred embodiment, the catalyst system of the invention includes an ionic stoichiometric activator solubilized or emulsified by the composition containing alternating atoms of Group 14 and Group 16. Ionizing activator compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

In a preferred embodiment, the stoichiometric activators include a cation and an anion component, and may be represented by the following formula:

$$(L-H)_d^+ (A^{d-}) \qquad (VI)$$

wherein L' is an neutral Lewis base;

H is hydrogen;

$(L-H)^+$ is a Bronsted acid $A^{d-}$ is a non-coordinating anion having the charge d− d is an integer from 1 to 3.

The cation component, $(L-H)_d^+$ may include Bronsted acids such as protons or protonated Lewis bases or reducible Lewis acids capable of protonating or abstracting a moiety, such as an akyl or aryl, from the bulky ligand metallocene-type or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. Most preferably, dimethylanaline. The activating cation $(L-H)_d^+$ may also be an abstracting moiety such as silver, carboniums, tropylium, carbeniums, ferroceniums and mixtures, preferably carboniums and ferroceniums. Most preferably $(L-H)_d^+$ is triphenyl carbonium.

The anion component $A^{d-}$ include those having the formula $[M^{k+}Q_n]^{d-}$ wherein k is an integer from 1 to 3; n is an integer from 2–6; n−k=d; M is an element selected from Group 13 of the Periodic Table of the Elements and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group.

In a most preferred embodiment, the ionic stoichiometric activator $(L-H)_d^+(A^{d-})$ is N,N-dimethylanilinium tetra (perfluorophenyl)borate or triphenylcarbenium tetra (perfluorophenyl)borate.

Examples of suitable $A^{d-}$ also include diboron compounds as disclosed in U.S. Pat. No. 5,447,895, which is fully incorporated herein by reference.

In one embodiment, an activation method using ionizing ionic compounds not containing an active proton but capable of producing a Group 15 containing metal compound cation or bulky ligand metallocene-type catalyst cation and their non-coordinating anion are also contemplated, and are described in EP-A-0 426 637, EP-A-0 573 403 and U.S. Pat. No. 5,387,568, which are all herein incorporated by reference.

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference.

Other suitable activators are disclosed in WO 98/09996, incorporated herein by reference, which describes activating bulky ligand metallocene-type catalyst compounds with perchlorates, periodates and iodates including their hydrates. WO 98/30602 and WO 98/30603, incorporated by reference, describe the use of lithium (2,2'-bisphenyl-ditrimethylsilicate).4THF as an activator for a bulky ligand metallocene-type catalyst compound. WO 99/18135, incorporated herein by reference, describes the use of organo-boron-aluminum acitivators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene-type catalyst compound or precursor to a bulky ligand metallocene-type cation capable of polymerizing olefins. Other activators or methods for activating a bulky ligand metallocene-type catalyst compound are described in for example, U.S. Pat. Nos. 5,849,852, 5,859,653 and 5,869,723 and WO 98/32775, WO 99/42467 (dioctadecylmethylammonium-bis(tris(pentafluorophenyl)borane) benzimidazolide), which are herein incorporated by reference.

Group 14 and Group 16 atom Containing Oils or Amorphous Solids

One or more Group 14 and Group 16 containing oil or amorphous solid are combined with the above described bulky ligand metallocene-type catalyst compounds and/or Group 15 metal containing catalyst compounds and/or activator compositions to form a catalyst, a catalyst activator, or an activated catalyst solution or emulsion. Preferably, the oil or amorphous solid contains alternating atoms of Group 14 and Group 16. More preferably, the oil or amorphous solid contains silicon or germanium and oxygen. More preferably the oil or amorphous solid is a siloxane, polysiloxane or a polysiloxane microgel and most preferably a siloxane. The Group 14 and Group 16 containing oil or amorphous solid, and in particular siloxanes, improve the solubility of catalyst and/or activators to form catalyst solutions or emulsions of relative higher activity, particularly when stoichiometric activators are utilized.

The Group 14 and Group 16 containing oil or amorphous solid are available in a wide range of solubility, and may be represented by one of the general formulae appearing below:

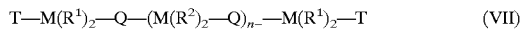

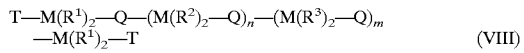

where each T is independently selected from, hydrogen, an alkyl, alkoxy, aryl, substituted aryl, cycloalkyl, substituted cyclic alkyl, cyclic aralkyl, substituted cyclic aralkyl, heteroatom, vinyl, silyl, silyloxy, vinylsiloxy, hydride, haloaryl, haloalkyl, or vinylsilyl containing group. Preferably, each T is independently selected from $C_1$ to $C_{20}$ alkyl or an aryl group. More preferably each T is independently a methyl, ethyl, isopropyl butyl, vinyl or phenyl group, and most preferably a methyl, ethyl or vinyl group.

Each M is independently an atom of Group 14 of the Periodic Table, preferably M is silicon or germanium, more preferably M is silicon.

Each Q is independently an atom of Group 16 of the Periodic Table of the Elements, preferably Q is oxygen.

Each $R^1$ and each $R^2$ is independently selected from hydrogen, an alkyl, alkoxy, aryl, substituted aryl, cycloalkyl, substituted cyclic alkyl, cyclic aralkyl, substituted cyclic aralkyl, heteroatom, vinyl, silyl, silyloxy, vinylsiloxy, hydride, haloaryl, haloalkyl, or vinylsilyl containing group. Preferably, each $R^1$ and each $R^2$ is independently selected from an alkyl group having 1 to 20 carbon atoms or an aryl group. More preferably, each $R^1$ and each $R^2$ is independently a methyl group, an ethyl group, or a haloalkyl. Most preferably, each $R^1$ and each $R^2$ is independently a methyl group, an ethyl group, or a fluoro-alkyl.

Each $R^3$ is independently selected from hydrogen, an alkyl, alkoxy, aryl, substituted aryl, cycloalkyl, substituted cyclic alkyl, cyclic aralkyl, substituted cyclic aralkyl, heteroatom, vinyl, silyl, silyloxy, vinylsiloxy, hydride, haloaryl, haloalkyl, or vinylsilyl containing group. Preferably, each $R^3$ is independently selected from an alkyl group having 1 to 20 carbon atoms, a halogenated alkyl group, or an aryl group. Most preferably, $R^3$ is a halogenated or non-halogenated methyl, ethyl, propyl or phenyl group.

n and m are independently 0 or an integer from 1 to 40,000, preferably from 1 to 20,000 and more preferably from 1 and 10,000.

In one embodiment, the terminal groups T, may be connected, by for example a heteroatom or by a polysiloxy group to form a cyclic siloxane.

The alkyl group, as used above, may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In one embodiment, the composition containing alternating atoms of Group 14 and Group 16 of the invention, preferably a siloxane or combination of siloxanes, has a viscosity of between about 1 cSt and 2,500,000 cSt, more preferably between about 100 cSt and 500,000 cSt, more preferably between about 100 cSt to about 50,000 cSt, and even more preferably between about 500 and 5000 cSt.

In one embodiment, the composition containing alternating atoms of Group 14 and Group 16 of the invention, preferably a siloxane or combination of siloxanes, has a number average molecular weight ($M_n$) of between about 40 and 500,000, more preferably between about 60 and 100,000 and even more preferably between about 1,000 and 60,000 and most preferably between about 5,000 and 40,000.

In a most preferred embodiment, the composition containing alternating atoms of Group 14 and Group 16 is a vinyl terminated dimethyl methyltrifluoropropylsiloxane with a $M_n$ of between about 20,000 and about 40,000.

Preparation of the Catalyst Solution or Emulsion

The method for making the catalyst solution or emulsion of the invention generally involves the combining, contacting, blending one or more of the Group 14 and Group 16 containing oil or amorphous solid described above with any catalyst compounds and/or activator compounds, alone or in combinations. Preferably, the Group 14 and Group 16 containing oil or amorphous solid is first purified as is known in the art. Most preferably, the Group 14 and Group 16 containing oil or amorphous solid is a siloxane, or combination of siloxanes, which has been purified, for example, by vacuum drying and/or refluxing in a suitable solvent, for example toluene, as is known in the art.

In a preferred embodiment, the catalyst solution or emulsion of the invention is formed by first combining the catalyst compound and/or the activator composition with an aliphatic or aromatic hydrocarbon, most preferably toluene, and then combining with the Group 14 and Group 16 containing oil or amorphous solid. When a siloxane is utilized, the resulting solution or emulsion is typically yellow or orange in color.

Optionally, a scavenger, preferably tri-n-octylaluminum, is added to Group 14 and Group 16 containing oil or amorphous solid, preferably prior to the addition of the catalyst compound. While not limited to any one particular theory, it is believed that the addition of a scavenger operates to remove residual hydroxyl groups and water from the preferred siloxane.

In general the catalyst compound(s) and the activator are combined in the solution or emulsion in mole ratios of catalyst compound to activator of about 1000:1 to about 0.5:1. In a preferred embodiment the catalyst compounds and the activator are combined in a mole ratio of about 300:1 to about 1:1, and preferably about 150:1 to about 1:1. For boranes, borates, aluminates, etc. the mole ratio of catalyst to activator is preferably about 1:1 to about 10:1 and for alkyl aluminum compounds (such as diethylaluminum chloride combined with water) the mole ratio is preferably about 0.5:1 to about 10:1. In a preferred embodiment, an ionizing activator is used and the mole ratio of the metal of the ionizing activator component to the metal of the catalyst compounds between about 0.3:1 to about 3:1.

Optionally, the catalyst solution or emulsion may be further diluted with aliphatic or aromatic hydrocarbon solvent, preferably pentane or toluene.

In general, the Group 14 and Group 16 containing oil or amorphous solid, preferably a siloxane, and the catalyst compound are combined in any useful weight ratio of weight siloxane:weight catalyst. Preferably, the weight ratio of weight siloxane:weight catalyst is between about 1:10 to 100:1 preferably between about 1:1 and about 70:1, more preferably between about 1:1 and about 50:1 and most preferably between about 20:1 to about 40:1

In another embodiment, at least one catalyst compound, at least one activator, and at least one Group 14 and Group 16 containing oil or amorphous solid, as described above, are combined to form a mixture with the mixture being heated during activation to improve homogeneity. The mixture is heated to between about 30° C. and about 250° C., more preferably between about 40° C. and about 100° C. and even more preferably between about 50° C. and about 70° C.

In another embodiment, the catalyst of the invention has a specific activity of between about 1 to 100,000,000 g/mmol·atm·h, more preferably between about 10 and 100,000 g/mmol·atm·h, more preferably between about 25 and 50,000 g/mmol·atm·h.

Supports, Carriers and General Supporting Techniques

The above described catalyst and/or activator solutions or emulsions may be combined with one or more support materials or carriers using one of the support methods well known in the art or as described below to form a supported catalyst system. For example, the Group 14 and Group 16 containing oil or amorphous solid catalyst and/or activator solution or emulsion may be deposited on, contacted with, vaporized with, bonded to, or incorporated within, adsorbed or absorbed in, or on, a support or carrier.

The terms "support" or "carrier", for purposes of this patent specification, are used interchangeably and are any support material, preferably a porous support material, including inorganic or organic support materials. Non-limiting examples of inorganic support materials include inorganic oxides and inorganic.chlorides. Other carriers include resinous support materials such as polystyrene, functionalized or crosslinked organic supports, such as polystyrene divinyl benzene polyolefins or polymeric compounds, zeolites, talc, clays, or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina, magnesium chloride, and mixtures thereof. Other useful supports include magnesia, titania, zirconia, montmorillonite (EP-B1 0 511 665), phyllosilicate, and the like. Also, combinations of these support materials may be used, for example, silica-chromium, silica-alumina, silica-titania and the like. Additional support materials may include those porous acrylic polymers described in EP 0 767 184 B1, which is incorporated herein by reference.

It is preferred that the carrier, most preferably an inorganic oxide, has a surface area in the range of from about 10 to about 700 $m^2/g$, pore volume in the range of from about 0.1 to about 4.0 cc/g and average particle size in the range of from about 5 to about 500 $\mu$m. More preferably, the surface area of the carrier is in the range of from about 50 to about 500 $m^2/g$, pore volume of from about 0.5 to about 3.5 cc/g and average particle size of from about 10 to about 200 $\mu$m. Most preferably the surface area of the carrier is in the range is from about 100 to about 400 $m^2/g$, pore volume from about 0.8 to about 3.0 cc/g and average particle size is from about 5 to about 100 $\mu$m. The average pore size of the carrier of the invention typically has pore size in the range of from 10 to 1000 Å, preferably 50 to about 500 Å, and most preferably 75 to about 350 Å.

Examples of supporting bulky ligand metallocene-type catalyst systems, which may be used to support the catalyst and/or activator solutions or emulsions of the invention, are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895 and 5,939,348 and U.S. application Ser. Nos. 271,598 filed Jul. 7, 1994 and 788,736 filed Jan. 23, 1997 and PCT publications WO 95/32995, WO 95/14044, WO 96/06187 and WO 97/02297, and EP-B1-0 685 494 all of which are herein fully incorporated by reference.

There are various other methods in the art for supporting the polymerization catalyst solutions or emulsions of the invention. For example, the bulky ligand metallocene-type catalyst compound of the invention may contain a polymer bound ligand as described in U.S. Pat. Nos. 5,473,202 and 5,770,755, which is herein fully incorporated by reference; the bulky ligand metallocene-type catalyst system of the invention may be spray dried as described in U.S. Pat. No. 5,648,310, which is herein fully incorporated by reference;

the support used with the bulky ligand metallocene-type catalyst system of the invention may be functionalized as described in European publication EP-A-0 802 203, which is herein fully incorporated by reference, or at least one substituent or leaving group may be selected as described in U.S. Pat. No. 5,688,880, which is herein fully incorporated by reference.

In another embodiment, an antistatic agent or surface modifier, that is used in the preparation of the supported catalyst system as described in PCT publication WO 96/11960, which is herein fully incorporated by reference, may be used with the Group 14 and Group 16 containing oil or amorphous solid catalyst and/or activator solutions or emulsions of the invention,. The catalyst systems of the invention can be prepared in the presence of an olefin, for example hexene-1.

In another embodiment, catalyst containing emulsions or solutions of the invention can be combined with a carboxylic acid salt of a metal ester, for example aluminum carboxylates such as aluminum mono, di- and tri-stearates, aluminum octoates, oleates and cyclohexylbutyrates, as described in U.S. application Ser. No. 09/113,216, filed Jul. 10, 1998.

A preferred method for producing a supported bulky ligand metallocene-type catalyst system, which maybe used to support the catalyst and/or activator solutions or emulsions of the invention, is described below, and is described in U.S. application Ser. Nos. 265,533, filed Jun. 24, 1994 and Ser. No. 265,532, filed Jun. 24, 1994 and PCT publications WO 96/00245 and WO 96/00243 both published Jan. 4, 1996, all of which are herein fully incorporated by reference. In this preferred method, the catalyst compound is slurried in a liquid and with a Group 14 and Group 16 containing oil or amorphous solid to form a catalyst solution or emulsion. A separate solution is formed containing an activator and a liquid. The liquid may be any compatible solvent or other liquid capable of forming a solution or the like with the catalyst compounds and/or activator. In the most preferred embodiment the liquid is a cyclic aliphatic or aromatic hydrocarbon, most preferably toluene. The catalyst compound and activator solutions are mixed together heated and added to a heated porous support or a heated porous support is added to the solutions such that the total volume of the bulky ligand metallocene-type catalyst compound solution and the activator solution or the bulky ligand metallocene-type catalyst compound and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

Polymerization Process

The Group 14 and Group 16 containing oil or amorphous solid containing catalyst compositions or systems of the invention described above are suitable for use in any pre-polymerization and/or polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the polymerization process of the invention include ethylenically unsaturated monomers, diolefins having 4 to 18 carbon atoms, conjugated or non-conjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a polymerization process.

In another embodiment of the process of the invention, ethylene or propylene is polymerized with at least two different comonomers, optionally one of which may be a diene, to form a terpolymer.

In one embodiment, the invention is directed to a polymerization process for polymerizing propylene alone or with one or more other monomers including ethylene, and/or other olefins having from 4 to 12 carbon atoms. Polypropylene polymers may be produced using the particularly bridged bulky ligand metallocene-type catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627, 242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes, where the siloxane catalyst and/or activator solutions or emulsions of the invention may be utilized, are described in U.S. Pat. Nos. 4,271,060, 5,001,205, 5,236,998 and 5,589,555, which are fully incorporated herein by reference.

A preferred process of the invention is where the process is operated in the presence of a bulky ligand metallocene-type catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference.

In one embodiment of the invention, olefin(s), preferably $C_2$ to $C_{30}$ olefin(s) or alpha-olefin(s), preferably ethylene or propylene or combinations thereof are prepolymerized in the presence of the catalyst solution or emulsion of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced by the process of the invention typically have a molecular weight distribution, a weight average molecular weight to number average molecular weight ($M_w/M_n$) of greater than 1 to about 40, preferably greater than 1.5 to about 15, more preferably greater than 2 to about 10, most preferably greater than about 2.0 to about 8.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

The bulky ligand metallocene-type catalyzed polymers of the invention in one embodiment have CDBI's generally in the range of greater than 50% to 100%, preferably 99%, preferably in the range of 55% to. 85%, and more preferably 60% to 80%, even more preferably greater than 60%, still even more preferably greater than 65%.

In another embodiment, polymers produced using a bulky ligand metallocene-type catalyst system of the invention have a CDBI less than 50%, more preferably less than 40%, and most preferably less than 30%.

The polymers of the present invention in one embodiment have a melt index (MI) or ($I_2$) as measured by ASTM-D-1238-E in the range of from less than 0.01 dg/min to 1000 dg/min, more preferably from about less than 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{21}/I_2$)($I_{21}$ is measured by ASTM-D-1238-F) of about 5 to less than about 2500, preferably about 15 to about 250, more preferably about 10 to about 25, more preferably from about 15 to about 25.

The polymers of the invention in a preferred embodiment have a melt index ratio ($I_{21}/I_2$)($I_{21}$ is measured by ASTM-D-1238-F) of from preferably greater than 10, more preferably greater than 30, even more preferably greater that 40, still even more preferably greater than 50 and most preferably greater than 65. In an embodiment, the polymer of the invention may have a narrow molecular weight distribution and a broad composition distribution or vice-versa, and may be those polymers described in U.S. Pat. No. 5,798,427 incorporated herein by reference.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene-type catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples of catalyst compositions of the invention and their polymerization results, are offered.

All polymerizations were performed in a 2.2 L Autoclave Engineers Zipperclave reactor. The ethylene feed was passed through a 1 L Labdlear purification bed and a 1 L 3 Å molecular sieve bed. The isobutane diluent was fed from 5 gallon tanks and passed through a 2.2 L Labclear purification bed. Prepurified hexene was obtained from in-house suppliers. Pentane and toulene were obtained pre-dried from Aldrich, then degassed and stored over molecular sieves in a drybox. All catalyst preparations were preformed in a nitrogen purged drybox.

Siloxanes were purchased from: Gelest Inc., Tullytown, Pa. The structures of those utilized appear below.

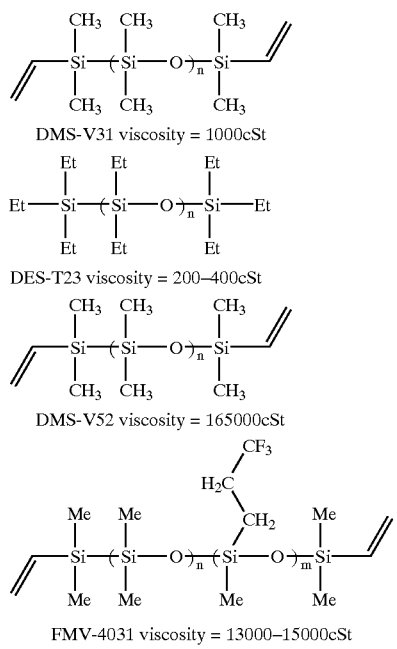

Standard Polymerization Technique

A 2.2 L zipperclave reactor was charged with 1.4 mL of a 25 wt % hexane solution of tri-n-octylaluminum (TNOA) then with 440 g of isobutane. This mixture was treated with ~200 psi. (1379 kPa) ethylene for 5 to 10 minutes then let back down to ~80 psi (552 kPa). The catalyst was injected into the reactor with nitrogen, and the reactor was brought to temperature (60 to 90° C.) with stirring. When the run temperature stabilized data collection began with ethylene supply to the reactor at 125 psi (862 kPa) over solvent pressure. Standard run time was 30 minutes. The reactor was vented and flushed with nitrogen then opened to collect the product.

Exceptions to the normal run profile are noted in the examples. The average run temperature and pressure, and the polymer yield, specific gravity and melt index, for each example, are provided in Table I.

Example 1

A 750 mg portion of a 54 wt % DMS-V31 solution in toluene was treated with 45 mg of a 25 wt % TNOA. To this was added cyclopentadienyl (pentamethylcyclopentadienyl)

zirconium dimethyl, (10 mg), then N,N-dimethylanilinium tetra(perfluorophenyl)borate (25 mg). The orange solution was heated with stirring to ~60° C. for several minutes then diluted with 1 ml toluene. The resulting homogeneous orange solution was added to 10 ml of pentane. Polymerization of ethylene with 0.3 ml of the dilute solution resulted in a yield of 73 g of polyethylene.

Example 2

A 760 mg portion of a 50 wt % DMS-V31 solution in toluene was treated with 45 mg of a 25 wt % TNOA. A toluene (400 mg) solution of (N,N-dimesityl-N'-methylethylenetriamine)ZrMe$_2$ (10 mg) was added to the siloxane solution and treated with N,N-dimethylanilinium tetra(perfluorophenyl)borate (18 mg). The mixture became dark orange and gas was evolved. The reaction was then heated with stirring to ~60° C. for several minutes then diluted with 10 ml toluene. Polymerization of ethylene with 0.3 ml of the dilute solution resulted in a yield of 3 g of polyethylene.

Example 3

350 mg of DMS-V31, 350 mg of toluene, and 36 mg of a 25 wt % solution in hexane of tri-n-octylaluminum were combined in a vial and mixed for 1 to 2 minutes at ~60° C. A 10 mg portion of bis(n-propylcyclopentadienyl)HfMe$_2$ was added with continued stirring and warming followed by 22 mg of triphenylcarbenium tetra(perfluorophenyl)borate. The mixture became dark yellow-orange. Stirring and beating continued for several minutes followed by addition of 1 ml toluene. This solution was mixed well then added to 10 ml toluene. Polymerization of ethylene with 0.3 ml of the dilute solution yielded 11.7 g of polymer.

Example 4

700 mg of a 50 wt % toluene solution of DMS-V31 and 36 mg of a 25 wt % solution in hexane of tri-n-octylaluminum were combined in a vial and mixed for 1 to 2 minutes at ~60° C. A 10 mg portion of dimethylsilyl-bis(tetrahydroindenyl)ZrMe$_2$ was added with continued stirring and warming followed by 24 mg of triphenylcarbenium tetra(perfluorophenyl)borate. The mixture became dark yellow-orange. Stirring and heating continued for several minutes followed by addition of 1 ml toluene. This solution was mixed well then added to 10 ml toluene. Polymerization of ethylene with 0.3 ml of the dilute solution yielded 110 g of polymer.

Example 5

700 mg of a 50 wt % toluene solution of DMS-V31 and 36 mg of a 25 wt % solution in hexane of tri-n-octylaluminum were combined in a vial and mixed for 1 to 2 minutes at ambient temperature. A 10 mg portion of dimethylsilyl-bis(tetrahydroindenyl)ZrMe$_2$ was added with continued stirring followed by 23 mg of triphenylcarbenium tetra(perfluorophenyl)borate. The mixture became yellow. Stirring continued for several minutes followed by addition of 1 ml toluene. This solution was mixed well then added to 10 ml toluene. Polymerization of ethylene with 0.3 ml of the dilute solution yielded 100 g of polymer.

Example 6

700 mg of a 50 wt % toluene solution of DES-T23 and 36 mg of a 25 wt % solution in hexane of tri-n-octylaluminum were combined in a vial and mixed for 1 to 2 minutes at ~60° C. A 10 mg portion of cyclopentadienyl (pentamethylcyclopentadienyl) zirconium dimethyl, was added with continued stirring and warming followed by 25 mg of N,N-dimethylanilinium tetra(perfluorophenyl)borate. The mixture became dark yellow-orange and gas was evolved. Stirring and heating continued for several minutes followed by addition of 1 ml toluene. This solution was mixed well then added to 10 ml toluene. Polymerization of ethylene with 0.3 ml of the dilute solution yielded 63 g of polymer.

Example 7

350 mg of DMS-V52, 350 mg of toluene, and 36 mg of a 25 wt % solution in hexane of tri-n-octylaluminum were combined in a vial and mixed for 1–2 minutes at ~60° C. A 10 mg portion of dimethylsilyl-bis(tetrahydroindenyl)ZrMe$_2$ was added with continued stirring and warming followed by 24 mg of triphenylcarbenium tetra(perfluorophenyl)borate. The mixture became dark yellow-orange. Stirring and heating continued for several minutes followed by addition of 1 ml toluene. This solution was mixed well then added to 10 ml toluene. Polymerization of ethylene with 0.3 ml of the dilute solution yielded 19.9 g of polymer.

Example 8

700 mg of a 50 wt % toluene solution of DES-T23 and 36 mg of a 25 wt % solution in hexane of tri-n-octylaluminum were combined in a vial and mixed for 1–2 minutes at ~60° C. A 10 mg portion of dimethylsilyl-bis(tetrahydroindenyl)ZrMe$_2$ was added with continued stirring and warming followed by 25 mg of triphenylcarbenium tetra(perfluorophenyl)borate. The mixture became dark yellow. Stirring and heating continued for several minutes followed by addition of 1 ml toluene. This solution was mixed well then added to 10 ml toluene. Polymerization of ethylene with 0.3 ml of the dilute solution yielded 60 g of polymer.

Example 9

700 mg of a 50 wt % toluene solution of DMS-V31 was combined with a 10 mg portion of dimethylsilyl-bis(tetrahydroindenyl)ZrMe$_2$ in a vial and mixed for 1–2 minutes at ~60° C., followed by 25 mg of triphenylcarbenium tetra(perfluorophenyl)borate. The mixture became dark yellow. Stirring and heating continued for several minutes followed by addition of 1 ml toluene. This solution was mixed well then added to 10 ml toluene. Polymerization of ethylene with 0.3 ml of the dilute solution yielded 17.4 g of polymer.

Example 10

700 mg of a 50 wt % toluene solution of DMS-V31 and 36 mg of a 25 wt % solution in hexane of tri-n-octylaluminum were combined in a vial and mixed for 1–2 minutes at ~60° C. A 10 mg portion of dimethylsilyl-bis(tetrahydroindenyl)ZrMe$_2$ was added with continued stirring and warming followed by 13 mg of tris(perfluorophenyl)borane. Stirring and heating continued for several minutes followed by addition of 1 ml toluene. This solution was mixed well then added to 10 ml toluene. Polymerization of ethylene with 0.3 ml of the dilute solution yielded 30 g of polymer.

Example 11

700 mg of a 50 wt % toluene solution of DMS-V31 and 36 mg of a 25 wt % solution in hexane of tri-n- octylaluminum were combined in a vial and mixed for 1–2 minutes at ~60° C. A 10 mg portion of dimethylsilyl-bis (tetrahydroindenyl)ZrMe$_2$ was added with continued stirring and warming followed by 25 mg of triphenylcarbenium tetra(perfluorophenyl)borate. The mixture became dark yellow. Stirring and heating continued for several minutes followed by addition of 1 ml toluene. This solution was mixed well then added to 10 ml pentane. Polymerization of ethylene with 0.3 ml of the dilute solution yielded 15 g of polymer.

Example 12

175 mg of a 50 wt % toluene solution of DMS-V31 and 36 mg of a 25 wt % solution in hexane of tri-n-octylaluminum were combined in a vial and mixed for 1–2 minutes at ~60° C. A 0.2 ml portion of a 0.125M toluene solution of [1-(2-pyridyl) N-1-methylethyl][1-N-2,6 diisopropylphenylamido] zirconium tribenzyl was added with continued stirring and warming followed by 23 mg of triphenylcarbenium tetra(perfluorophenyl)borate. Stirring and heating continued for several minutes followed by addition of 1 ml toluene. This solution was mixed well then added to 10 ml toluene. Polymerization of ethylene with 0.3 ml of the dilute solution yielded 18.8 g of polymer.

Example 13

175 mg of a 50 wt % toluene solution of DMS-V31 and 36 mg of a 25 wt % solution in hexane of tri-n-octylaluminum were combined in a vial and mixed for 1–2 minutes at ~60° C. A 0.3 ml portion of a 0.08M toluene solution of [1-(2-pyridyl) N-1-methylethyl][1-N-2,6 diisopropylphenylamido][2-methyl-1-phenyl-2-propoxy] zirconium dibenzyl was added with continued stirring and warming followed by 23 mg of triphenylcarbenium tetra (perfluorophenyl)borate. Stirring and heating continued for several minutes followed by addition of 1 ml toluene. This solution was mixed well then added to 10 ml toluene. Co-polymerization of ethylene with hexene, with 0.3 ml of the dilute solution, yielded 16.9 g of polymer.

Example 14

A 350 mg portion of a 50 wt % DMS-V31 in toluene was treated with 36 mg of 25 wt % tri-n-octylaluminum in hexanes. A toluene (0.5 ml) solution of 12 mg of (N,N-dimesityl-N'-methyl-ethylenetriamine)ZrMe2 was added to the siloxane and treated with 23 mg of triphenylcarbenium tetra(perfluorophenyl)borate. The mixture became dark orange. The reaction was then stirred for several minutes then 0.5 ml of toluene was added. The solution was mixed further and then added to 10 ml toluene. Polymerization of ethylene with 0.3 ml of the dilute solution resulted in a yield of 16.3 g of polyethylene.

Example 15

A 700 mg portion of a 54 wt % DMS-V31 solution in toluene was treated with 72 mg of a 25 wt % TNOA. cyclopentadienyl (pentamethylcyclopentadienyl) zirconium dichloride (10 mg), was added and the mixture was warmed to ~60° C. until the metallocene dissolved. At this point the solution was bright yellow. The metallocene was activated with 23 mg of triphenylcarbenium tetra(perfluorophenyl) borate. The orange solution was heated with stirring to ~60° C. for several minutes then diluted with 1 ml toluene. The resulting solution was stirred with warming for several minutes with 1 ml toluene and mixed further. This solution was then added to 10 ml toluene. Polymerization of ethylene with 0.3 ml of the dilute solution resulted in a yield of 10 g of polyethylene.

Example 16

A 700 mg portion of a 54 wt % FMV-4031 in toluene was treated with 73 mg of 25 wt % tri-n-octylaluminum in hexanes. The pentamethylcyclopentadienyl (n-propyl-cyclopentadienyl) zirconium dichloride (Cp*Cp$^{n-pr}$ZrCl$_2$) (11 mg), was added to the siloxane and mixed for several minutes. The solution was then treated with 23 mg of triphenylcarbenium tetra(perfluorophenyl)borate. The reaction was stirred for several minutes, then 1 ml of toluene was added. The solution was mixed further and then added to 10 ml toluene. Polymerization of ethylene with 0.3 ml of the dilute solution resulted in a yield of 29.4 g of polyethylene.

Example 17

A 350 mg portion of a 54 wt % FMV-4031 in toluene was treated with 72 mg of 25 wt % tri-n-octylaluminum in hexanes. Dimethylsilyl-bis(tetrahydroindenyl)ZrMe$_2$ (11 mg) was added to the siloxane and mixed for several minutes. The solution was then treated with 23 mg of triphenylcarbenium tetra(perfluorophenyl)borate. The reaction was stirred for several minutes, then 1 ml of toluene was added. The solution was mixed further and then added to 10 ml toluene. Polymerization of ethylene with 0.3 ml of the dilute solution resulted in a yield of 33 g of polyethylene.

Example 18

A 700 mg portion of a 50 wt % DMS-V31 in toluene was treated with 36 mg of 25 wt % tri-n-octylaluminum in hexanes. A toluene (0.5 ml) solution of 9 mg of (N,N-dimesityl-N'-methyl-ethylenetriamine)ZrMe$_2$ was added to the siloxane followed by a 4.5 mg portion of dimethylsilyl-bis(tetrahydroindenyl)ZrMe$_2$. The mixture was then treated with 24 mg of triphenylcarbenium tetra(perfluorophenyl) borate. The reaction was then stirred for several minutes then 0.5 ml of toluene was added. The solution was mixed further and then added to 10 ml toluene. Polymerization of ethylene with 0.3 ml of the dilute solution resulted in a yield of 76.5 g of polyethylene.

Example 19

A 11.9 g sample of silica dried at elevated temperatures was mixed in toluene with 6.5 g of a 25 wt % hexanes solution of triethylaluminum (TEAL) for 15 minutes. The silica was recovered by filtration and dried in vacuuo. A 700 mg portion of a 50 wt % DES-T23 in toluene was treated with 46 mg of 25 wt % tri-n-octylaluminum in hexanes. cyclopentadienyl (pentamethylcyclopentadienyl) zirconium dimethyl (10 mg), was added to the siloxane followed by 24 mg of triphenylcarbenium tetra(perfluorophenyl)borate. The reaction was stirred for several minutes then 1.4 ml of toluene was added. The solution was mixed further and then 0.5 g of the TEAL-treated silica was added and the mixture was stirred with a spatula. The solids were then dried in vacuuo. Polymerization of ethylene with 0.1 g of the finished solid resulted in a yield of 38.8 g of polyethylene. Note that the pretreatment of isobutane diluent with ethylene as described in the general polymerization technique was not performed in this example.

Example 20

500 mg of FMV-4031 and 111 mg of a 25 wt % solution in hexane of tri-n-octylaluminum were combined in a vial and mixed. A 32 mg portion of bis(n-propylcyclopentadienyl)HfMe$_2$ was added with continued stirring followed by 70 mg of triphenylcarbenium tetra(perfluorophenyl)borate. Stirring continued for several minutes followed by addition of 1 ml toluene. To this mixture was added silica (1 g) previously treated with a mixture of MAO and bis(n-propylcyclopentadienyl)ZrCl$_2$. The resulting solids were mixed with a spatula and dried in vacuuo. Polymerization of ethylene with 0.1 g of the finished solids yielded 64.8 g of polymer. Note that the pretreatment of isobutane diluent with ethylene as described in the general polymerization technique was not performed in this example.

Example 21

700 mg of FMV-4031 and 36 mg of a 25 wt % solution in hexane of tri-n-octylaluminum were combined in a vial and mixed. A 15 mg portion of (N,N'-2,6-diisopropylphenyl-ethylene-di-imine)NiBr$_2$ was added, at which point the solution became dark violet. After a few minutes of mixing, 23 mg of triphenylcarbenium tetra(perfluorophenyl)borate was added. Stirring continued for several minutes followed by addition of 1 ml toluene. The solution was mixed then added to 10 ml of toluene. Polymerization of ethylene with 0.3 ml of the dilute solution yielded 0.50 g of polymer.

TABLE I

| Example Number | Average Run Temp. °C. | Average Run Pressure psi (kPa) | Polymer Yield g | Specific Activity g/mmol · atm · h | Flow Index $I_{21}$ (dg/min) |
|---|---|---|---|---|---|
| 1 | 90 | 378(2606) | 73.0 | 25514 | 4.0 |
| 2 | 90 | 393(2710) | 3.0 | 933 | 0.2 |
| 3 | 90 | 379(2613) | 11.7 | 4149 | NF* |
| 4 | 90 | 375(2586) | 110 | 38547 | 2.2 |
| 5 | 90 | 373(2572) | 100 | 36323 | — |
| 6 | 90 | 376(2592) | 63.0 | 22526 | 3.5 |
| 7 | 90 | 381(2627) | 19.9 | 6749 | 5.5 |
| 8 | 90 | 376(2592) | 60.8 | 22925 | 5.0 |
| 9 | 90 | 376(2592) | 17.4 | 6120 | 4.0 |
| 10 | 90 | 376(2592) | 30.6 | 10814 | 5.2 |
| 11 | 90 | 377(2599) | 15.6 | 5470 | 3.6 |
| 12 | 90 | 377(2599) | 18.8 | 6584 | 0.6 |
| 13 | 90 | 376(2592) | 16.9 | 6001 | 2.6 |
| 14 | 61 | 376(2592) | 16.3 | 5691 | NF* |
| 15 | 90 | 375(2586) | 10.0 | 3546 | 13 |
| 16 | 90 | 401(2765) | 29.4 | 8595 | 0.5 |
| 17 | 90 | 377(2599) | 33.1 | 11633 | 1.4 |
| 18 | 90 | 374(2579) | 76.5 | 27508 | 3.1 |
| 19 | 90 | 378(2606) | 38.8 | 4636 | 4.5 |
| 20 | 90 | 378(2606) | 64.8 | 1675 | 2.4 |
| 21 | 61 | 380(2620) | 0.50 | 100 | — |

*NF indicates the polymer does not flow under test conditions

While the present invention has been described and illustrated by reference to particular embodiments, those of ordinary skill in the art will appreciate that the invention lends itself to variations not necessarily illustrated herein. For example, more than one siloxane may be utilized to solubilize or emulsify more than one polymerization catalyst compound and/or more than one activator compound. For this reason, then, reference should be made solely to the appended claims for purposes of determining the true scope of the present invention.

We claim:

1. A method of preparing a polymerization catalyst comprising combining an oil or amorphous solid with a polymerisation catalyst compound and a stoichiometric activator;

wherein the oil or amorphous solid is represented by the following formulae:

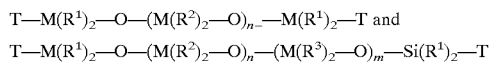

wherein, independently, each T, $R^1$, $R^2$, and $R^3$ consists essentially of hydrogen, $C_1$ to $C_{20}$ alkyl, aryl, vinyl, and fluoro-alkyl; each M is independently a silicon or germanium atom; and wherein n and m are independently an integer between 1 and 40,000; and wherein the polymerization catalyst compound is selected from metallocene catalyst compounds, Group 15 metal containing catalyst compounds, and combinations thereof.

2. The method of claim 1, further comprising first combining the polymerization catalyst compound with the stoichiometric activator in an aliphatic or aromatic hydrocarbon.

3. The method of claim 1, further comprising heating the polymerization catalyst.

4. The method of claim 1, wherein the oil or amorphous solid is a siloxane.

5. The method of claim 1, wherein the weight ratio of weight of oil or amorphous solid to weight of polymerisation catalyst compound is between 1:10 and 100:1.

6. The method of claim 1, wherein the weight ratio of weight of oil or amorphous solid to weight of polymerisation catalyst compound is between 1:1 and 70:1.

7. The method of claim 1, further comprising combining a scavenger with the oil or amorphous solid.

8. The method of claim 1, wherein the polymerization catalyst is further combined with a support or carrier.

9. The method of claim 1, wherein the stoichiometric activator is selected from tri (n-butyl) ammonium tetrakis (pentafluorophenyl) boron, tris(perfluorophenyl) boron, tris (perfluoronaphthyl) boron, polyhalogenated heteroborane anions and combinations thereof.

10. The method of claim 1, wherein the weight ratio of weight of polymerization catalyst compound to the weight of stoichiometric activator is between 300:1 to 1:1.

11. A catalyst system for polymerising olefins comprising an oil or amorphous solid, at least one polymerisation catalyst compound, and a stoichiometric activator; wherein the oil or amorphous solid is represented by the following formulae:

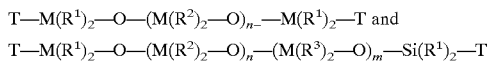

wherein, independently, each T, $R^1$, $R^2$, and $R^3$ consists essentially of hydrogen, $C_1$ to $C_{20}$ alkyl, aryl, vinyl, and fluoro-alkyl; each M is independently a silicon or germanium atom; and wherein n and m are independently an integer between 1 and 40,000; and wherein the polymerization catalyst compound is selected from metallocene catalyst compounds, Group 15 metal containing catalyst compounds, and combinations thereof.

12. The catalyst system of claim 11, wherein each T is independently a methyl, ethyl or vinyl group.

13. The catalyst system of claim 11, wherein each $R^1$ and $R^2$ is independently a methyl or ethyl group.

14. The catalyst system of claim 11, wherein each $R^3$ is independently a non-halogenated methyl, non-halogenated ethyl, non-halogenated propyl or non-halogenated phenyl group.

15. The catalyst system of claim 11, wherein the oil or amorphous solid is a siloxane.

16. The catalyst system of claim 11, wherein the weight ratio of weight of oil or amorphous solid to weight of polymerisation catalyst compound is between 1:10 and 100:1.

17. The catalyst system of claim 11, wherein the weight ratio of weight of oil or amorphous solid to weight of polymerisation catalyst compound is between 1:1 and 70:1.

18. The catalyst system of claim 11, further comprising combining a scavenger with the oil or amorphous solid.

19. The catalyst system of claim 11, wherein the polymerization catalyst is further combined with a support or carrier.

20. The method of claim 11, wherein the stoichiometric activator is selected from tri (n-butyl) ammonium tetrakis (pentafluorophenyl) boron, tris(perfluorophenyl) boron, tris (perfluoronaphthyl) boron, polyhalogenated heteroborane anions and combinations thereof.

21. The method of claim 11, wherein the weight ratio of weight of polymerization catalyst compound to the weight of stoichiometric activator is between 300:1 to 1:1.

* * * * *